Feb. 11, 1941.  E. DELACUVELLERIE  2,231,857
GLASS DRAWING APPARATUS
Filed Jan. 8, 1937

INVENTOR:
ERNEST DELACUVELLERIE
BY C.F. Wm Forssberg
ATTORNEY

Patented Feb. 11, 1941

2,231,857

UNITED STATES PATENT OFFICE 2,231,857

GLASS DRAWING APPARATUS

Ernest Delacuvellerie, Brussels, Belgium

Application January 8, 1937, Serial No. 119,546
In Belgium January 10, 1936

3 Claims. (Cl. 49—17)

My invention relates to driving rollers, which are used in pairs for engaging sheet glass in the glass drawing process. Usually rollers employed to that end are made of compressed asbestos; they are rigid and they are arranged to move bodily away from each other when the surface of the glass is uneven. It follows that frequently a roller is in contact with the glass sheet at two or three points only, and this gives rise to undue local pressures capable of breaking the glass. Moreover, in order to enable the rollers to move away from each other while remaining in driving engagement with the glass sheet, the rollers of each pair are usually geared together by means of long teeth gears; this sometimes gives rise to jamming and to an uneven driving motion.

My invention has for its object to remove these and other inconveniences, to be set forth hereafter. With this end in view, for the rigid rollers I substitute elastically deformable rollers, capable of automatically adjusting themselves to the surface of the glass sheet engaged therebetween. I further arrange these rollers in such manner that the distance between their respective driving shafts may remain constant whatever be the thickness of the glass sheet treated, and irrespective of local or accidental variations of such thickness. Where this is desirable, I may however also arrange to vary the distance between the roller shafts.

In the accompanying drawing, I have illustrated by way of example a constructional embodiment of my invention.

Referring to the drawing.

In the above views, the same references indicate the same or like parts.

Figure 1:
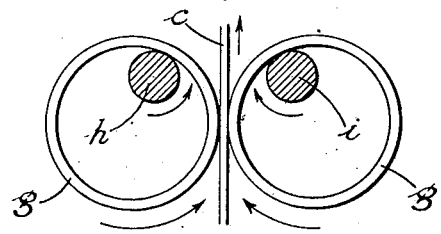
Fig. 1 is a sectional elevation.

In the practice of my invention, and as shown on the drawing, $c$ is the vertically drawn sheet of glass engaged between a pair of deformable yielding rollers comprising each a series of narrow rings.

Figure 4:
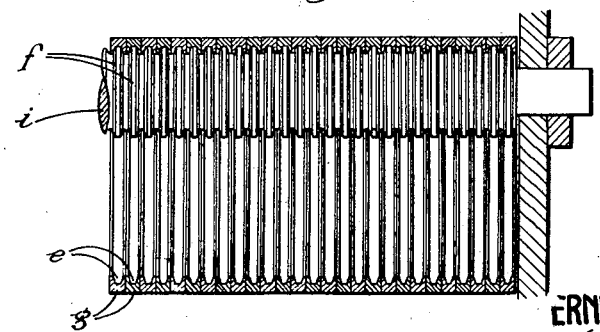
Fig. 4 is a sectional view on a larger scale on line VI—VI of Fig. 3.

In accordance with my invention, the deformable or yielding rollers comprise each a series of narrow rings $g$ of metal, compressed asbestos or other suitable material, which are placed side by side and are movable at right angles to the roller, independently of one another. They are mounted on a shaft $h$ or $i$ the diameter of which is substantially smaller than the inner diameter of said rings. Thus being, so to speak, suspended from the shaft, the rings are free to oscillate transversely thereof and this allows them to move both individually and as a whole, so that they can move singly to accommodate local inequalities of the sheet or all together to engage a thicker sheet or a thinner sheet, without the shafts $h$, $i$ having to be adjusted in position. Each ring $g$, thus will remain in contact with the glass sheet $c$ whatever be its inequalities; as a whole the roller composed of such rings is adapted to follow the surface of the glass over its entire surface, including the marginal beads $c'$ (Fig. 4). Beyond these beads the cooperating roller of each pair bear against each other and leave no gap between them.

Sidewise or creeping movement of the rings along their supporting shafts is prevented by confining them between discs $m$ or $m'$ of a greater diameter than the shaft but of a smaller diameter than the diameter of the shaft plus twice the thickness of the rings, said discs being secured to the shaft one at each end of the roller.

Figure 3:
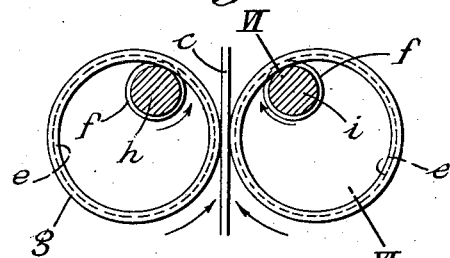
Fig. 3 is a sectional elevation showing a modification.
Figure 2:
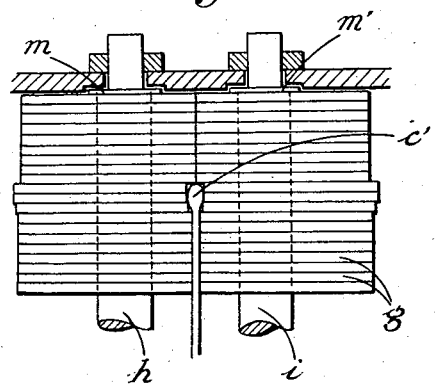
Fig. 2 is a partial plan view of rollers according to my invention.

I may also obtain the same result by preventing the lateral movement of each ring. Thus, for example, I may provide in the inner surface of each ring a groove $e$ (Figs. 3 and 4), and on the carrying shaft ribs $f$ adapted each to engage one of said grooves. Of course grooves may be provided in the shaft and ribs on the inner surface of the rings if desired.

I may further provide on the inner periphery of the rings teeth in driving engagement with teeth on the shaft $h$ or $i$, although this usually will not be necessary, the frictional engagement of smooth surfaces being sufficient to ensure the transmission of the rotation from the shaft to the compound roller carried thereby.

It will be noticed that the entire arrangement is of great simplicity, and requires neither oscillating shafts nor counterweights, this being a further advantage of importance.

Of course the invention is not limited to the constructional details herein described and illustrated by way of example, and modifications may be made therein without departing from its scope as defined by the appended claims.

I claim:

1. In glass drawing apparatus, the combination of two parallel shafts, a pair of coacting rollers eccentrically supported one on each of said shafts, said rollers comprising each a plurality of narrow rings arranged side by side, the inner diameter of said rings being substantially larger than the diameter of said shafts, said shafts having a driving frictional engagement with the inner surface of said rings, and means on both said shafts and on the inner surface of each of said rings for preventing sidewise movement of the rings along their respective supporting shafts.

2. In glass drawing apparatus, the combination of two parallel shafts, a pair of coacting rollers eccentrically supported one on each of said shafts, said rollers comprising each a plurality of narrow rings arranged side by side, the inner diameter of said rings being substantially larger than the diameter of said shafts, said shafts having a driving frictional engagement with the inner surface of said rings, and interengaging means on the periphery of each shaft and on each of the rings carried thereby for preventing sidewise movement of said rings along said shafts.

3. In glass drawing apparatus, the combination of two parallel shafts, a pair of coacting rollers eccentrically supported one on each of said shafts, said rollers comprising each a plurality of narrow rings arranged side by side, the inner diameter of said rings beng substantially larger than the diameter of said shafts, said shafts having a driving frictional engagement with the inner surface of said rings, circular ribs on each of said shafts in equal number to the rings carried thereby, said rings having each in its inner surface a groove engaged by one of said ribs.

ERNEST DELACUVELLERIE.